(12) United States Patent
Van Blokland

(10) Patent No.: US 11,406,109 B2
(45) Date of Patent: Aug. 9, 2022

(54) DEVICE FOR PROCESSING DOUGH

(71) Applicant: Radie B.V., BC Culemborg (NL)

(72) Inventor: Johannes Josephus Antonius Van Blokland, BG Laren (NL)

(73) Assignee: RADIE B.V.

( * ) Notice: Subject to any disclaimer, the term of this patent is extended or adjusted under 35 U.S.C. 154(b) by 0 days.

(21) Appl. No.: 17/118,108

(22) Filed: Dec. 10, 2020

(65) Prior Publication Data

US 2021/0186035 A1 Jun. 24, 2021

(30) Foreign Application Priority Data

Dec. 18, 2019 (EP) ..................... 19217563

(51) Int. Cl.
*A21C 3/06* (2006.01)
*A21C 9/08* (2006.01)
*A21C 5/00* (2006.01)
*A21C 11/12* (2006.01)

(52) U.S. Cl.
CPC ............... *A21C 9/086* (2013.01); *A21C 3/06* (2013.01); *A21C 5/003* (2013.01); *A21C 9/088* (2013.01); *A21C 11/12* (2013.01)

(58) Field of Classification Search
None
See application file for complete search history.

(56) References Cited

U.S. PATENT DOCUMENTS

2006/0222749 A1* 10/2006 Ruhe ..................... A21C 3/02
426/502
2010/0196564 A1 8/2010 Cepeda Mendoza et al.

FOREIGN PATENT DOCUMENTS

| DE | 102008036624 A1 | | 2/2010 | |
|---|---|---|---|---|
| DE | 202014103709 U1 | | 10/2014 | |
| DK | 1588620 | * | 10/2005 | ............ A21C 11/10 |
| DK | 102014215808 | * | 11/2015 | ............ A21C 11/10 |
| EP | 2989896 A1 | | 7/2015 | |
| EP | 3167718 A1 | | 5/2017 | |
| JP | S52-15880 A | | 2/1977 | |

OTHER PUBLICATIONS

Sollich; Thomas, EP1588620 English Translation 2005 (Year: 2005).*
Schleicher; Katrin, DE102014215808 English Translation 2015 (Year: 2015).*
European Search Report dated Jul. 9, 2020.

* cited by examiner

*Primary Examiner* — Jacob T Minskey
*Assistant Examiner* — Adrien J Bernard
(74) *Attorney, Agent, or Firm* — Katten Muchin Rosenman LLP

(57) ABSTRACT

Device for processing dough, comprising at least one transporting conveyor having a transport surface for transporting a first dough sheet, at least one feed line, for feeding at least a second dough sheet onto the first dough sheet, thus forming a multi-layered dough sheet, and at least one incision maker with a pattern of protruding blades for cutting a pattern of incisions in at least one of the dough sheets, the protruding blades movable with a directional component towards and from the direction of the transport surface and a cutting station for cutting the multi-layered dough sheet into dough pieces and a rolling station for rolling up the cut out dough pieces.

13 Claims, 4 Drawing Sheets

DEVICE FOR PROCESSING DOUGH

CROSS REFERENCE TO RELATED APPLICATIONS

This application claims priority of European Patent Application No. 19217563.6, filed on Dec. 18, 2019 in the European Patent Office, and herein incorporated by reference in its entirety.

TECHNICAL FIELD

The present invention relates to a device and a method for processing dough, in particular the processing of different dough sheets. The processing of said dough sheets may be used as a preparation step for rolling and baking of croissants.

BACKGROUND

Classic croissants are made of a single type of dough, rolled up and baked into a fluffy bakery product. Consumers are becoming more demanding and show a growing interest in exclusive and more aesthetic types of bakery products.

New shapes like U-shaped and round croissants with the tips of the bent ends on top of each other have become more common. Bakers are not only experimenting with different shapes, but also with combinations of different type of doughs, such as multi coloured or multi flavoured ones. Different colours of dough may be used for a coloured effect on the side of the bakery product, such as a croissant. A machine for processing dough products with enhanced aesthetics by using two dough sheets is known in the state of the art, an example of which is disclosed in US patent publication No. 2010/0196564.

Another way to improve aesthetics of bakery products is the use of rasters of dough, which are common for example in pies, incisions can be made in a dough sheet and successively the dough sheet is pulled apart and placed on top of the bakery product. Disadvantage of state of the art technologies is that due to the effects of the baking process it is impossible to reproduce the same outcome of each end product. To provide alternative structures or flavours to the surface of a dough product this can be done by manual applications. This however is very time consuming and cannot be applied to large scale production processes. In patent publications DE202014103709 and EP2989896, a patterned bakery product is presented with wide openings in the outer surface. DE202014103709 and EP2989896 present a bakery product wherein dough parts are taken out of a dough sheet to create openings, that can be filled up with other dough to create a patterned end product. Downside of this end product is that the pattern is neither predictable, nor precisely reproducible. In order not to waste the dough pieces that are taken out of the dough sheet, special handling of this scrap is required. In the European Patent EP2989896 a two coloured croissant is shown as an end product. To achieve this result incisions are made in a dough sheet and this dough sheet is rolled out by a waltz to create openings in the dough, solving the waste argument, however still remaining a downside of a not accurately reproducible end product. Another disadvantage is that the rolling of the product is sensitive to disruptions and needs a lot of space in a processing line.

SUMMARY

It is a goal of the present invention to provide a device and a method for processing dough, in particular multi-layered dough, that takes away the disadvantages of the prior art, or to provide at least a useful alternative thereto.

The invention thereto proposes a device for processing dough, comprising at least one transporting conveyor having a transport surface for transporting a first dough sheet, at least one feed line for feeding at least a second dough sheet onto the first dough sheet, thus forming a multi-layered dough sheet, at least one incision maker with a pattern of protruding blades for cutting a pattern of incisions in at least one of the dough sheets where the protruding blades are movable with a directional component towards and from the direction of the transport surface, a cutting station for cutting the multi-layered dough sheet into dough pieces, and a rolling station for rolling up the cut out dough pieces, preferably for rolling into croissants.

The present invention also relates to a method for making multi-coloured croissants, comprising the following steps: making at least two dough sheets, with different characteristics, preferably of different colour; making the at least two sheets of dough into a multi-layered dough sheet, for example by laminating or putting them on top of each other; cutting a pattern of incisions in one surface of the multi-layered dough sheet and with a depth that is partly the depth of the total depth of the multi-layered dough piece, in particular the depth of the first dough sheet; cutting the multi-layered dough provided with incisions into dough pieces; and rolling up the dough pieces, with the incised surface on the outside, baking the rolled up dough pieces, enabling the incised outside surface of the dough piece to rise and thus creating a gap, showing the dough of another dough sheet underneath. The step of cutting a pattern of incisions may be preceded or followed by the step of making at least two dough sheets into a multi-layered dough sheet. The incisions may be cut in the lower or the upper surface of the dough sheet, preferably in the lower surface of the first dough sheet.

Therewith it is conceivable that a step of bending the dough pieces is performed, for bending into croissants, before baking. Additionally, bending may be followed by pinching and/or clamping of the ends of the bend dough pieces, before baking to suit the bakers preferences.

BRIEF DESCRIPTION OF THE DRAWINGS

The invention will be elucidated in more detail with reference to the following non-limitative figures.

DETAILED DESCRIPTIONS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
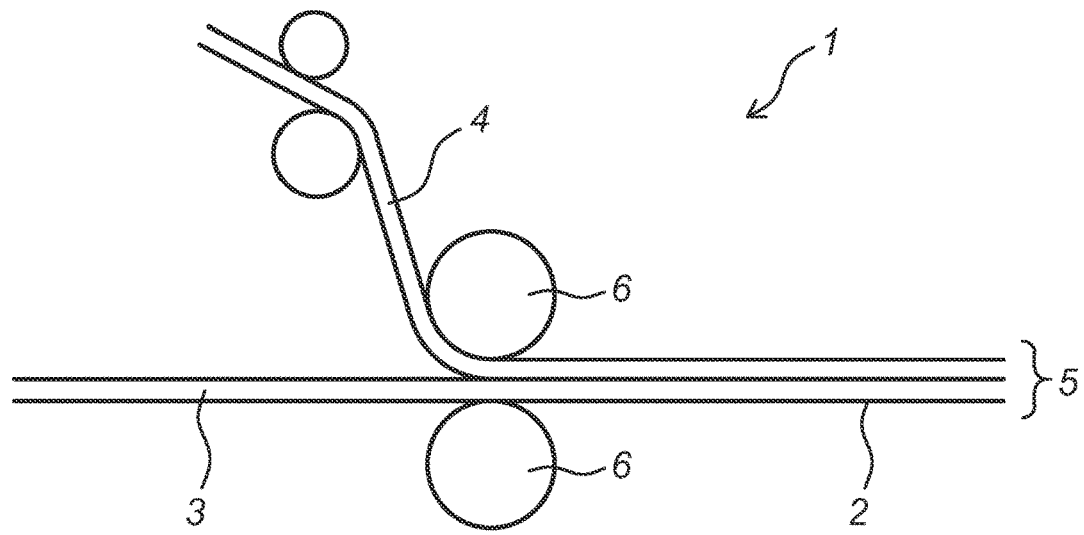
FIG. 1 shows a side view of an embodiment of a feed line.

FIG. 1 shows a schematic side view of an embodiment of a feed line 1 for a second dough sheet 4 onto a first dough sheet 3. The transporting conveyor (not shown) has a transport surface 2 for transporting a first dough sheet 3 and a feed line 1, for feeding at least a second dough sheet 4 onto the first dough sheet 3, thus forming a multi-layered dough sheet 5. The rollers 6 are an example of a pressing station, for a better adherence between the two dough sheets in the multi-layered dough sheet 5.

FIGS. 2a-2b and 3a-3b show different embodiments of the incision maker 10 as a roller with a pattern of protruding blades 8 for cutting a pattern of incisions in at least one of the dough sheets, wherein the protruding blades are movable with a directional component D towards and from the direction of the transport surface 2.

Figure 2A:
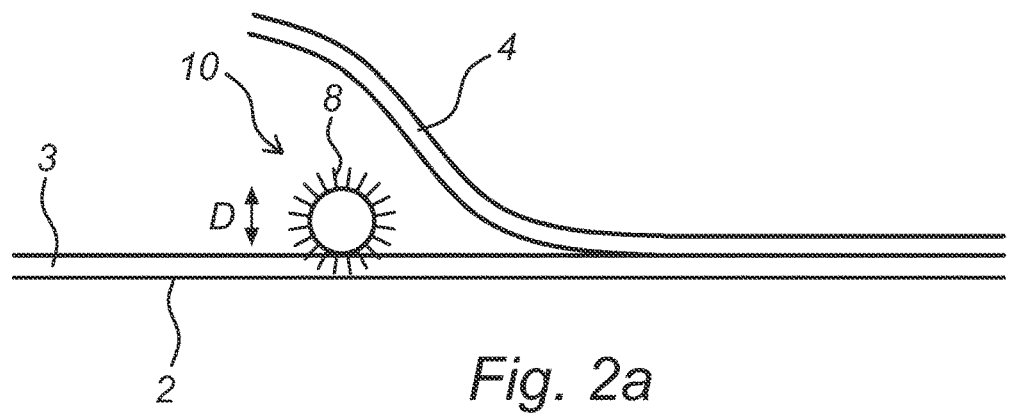
FIGS. 2a and 2b show different embodiments of an incision maker positioned above the transporting conveyor.

FIG. 2a shows the incision maker 10 positioned above the transporting conveyor (not shown), at a position before the feed line feeding a second sheet 4 and, cutting incisions in the first dough sheet 3, wherein the protruding blades 8 are configured to touch the transport surface 2 in an outmost position of the movement with the directional component D toward the transport surface 2.

Figure 2B:
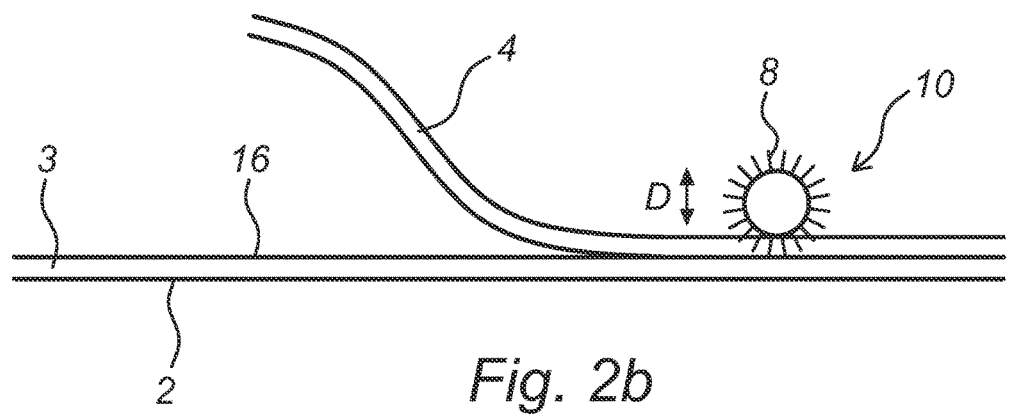

FIG. 2b shows the incision maker 10 positioned above the transporting conveyor (not shown), at a position after the feed line, feeding a second sheet 4 onto a first sheet 3 and, cutting incisions in the second dough sheet 4, wherein the protruding blades 8 are configured to touch the upper surface of the first dough sheet 16 in an outmost position of the movement with the directional component D toward the transport surface 2.

Figure 3A:
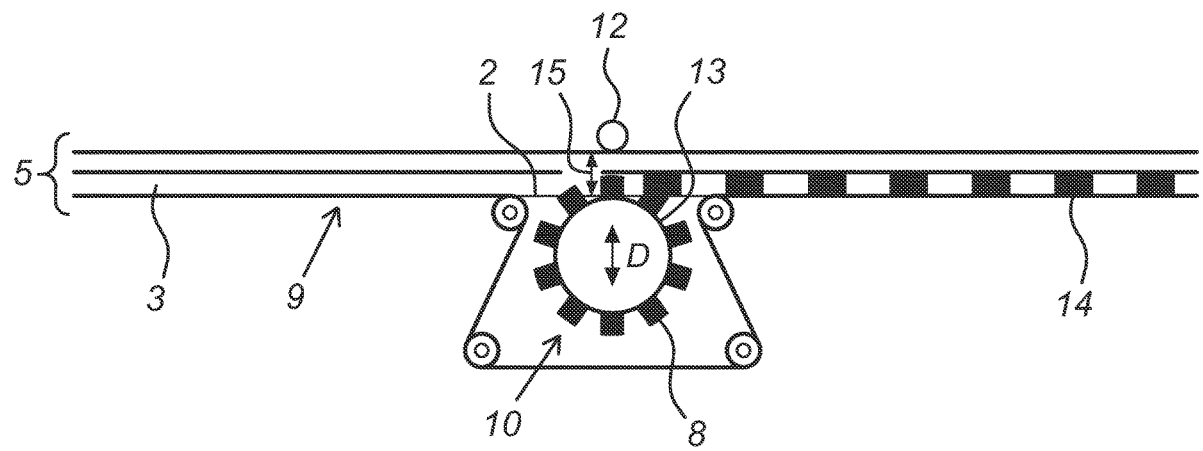
FIGS. 3a and 3b show different embodiments of an incision maker positioned below the transporting conveyor.
Figure 3B:
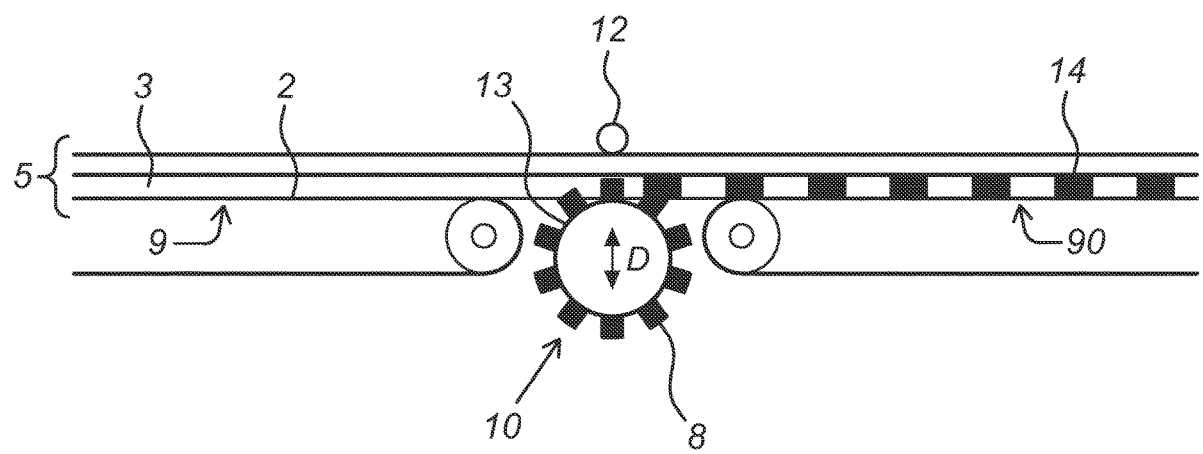

FIGS. 3a and 3b show two examples of the incision maker 10, wherein the at least one incision maker 10 is a roller, with the axis positioned under the transport surface 2, wherein the protruding blades 8 extend beyond the transport surface 2, having at least one position to cut incisions 14 through the first dough sheet 3. The incision maker 10 has an outermost mantle surface 13, of which the highest point of the mantle in direction of the transport surface coincides with said transport surface, from where protruding blades extend in order not to cut through the entire multi-layered dough sheet 5 and in particular not through all layers the multi-layered dough sheet comprises. A retaining part 12 is shown, spaced at a distance 15 vertically above the incision maker 10, wherein the protruding blades 8 extend beyond the transport surface 2, at least as far as through the first dough sheet and less than the distance between the retaining part and the incision maker, wherein the retaining part 12, is vertically movable to apply a force on the first or the multi-layered dough sheet in the direction of the incision maker 10.

FIG. 3a shows an embodiment of the incision maker, wherein the transporting conveyor 9 is led around the incision maker 10.

FIG. 3b shows an embodiment of the incision maker 10 of the device according to the present invention comprising two successive transport conveyors 9, 90, with the incision maker 10 positioned under the transport surface 2, in between them to cut the incisions in the lower surface of the multi-layered dough sheet or the surface of the first dough sheet 3 facing the transport surface 2. Advantageous aspect of this embodiment is that the speed of conveyor 9 may be faster and/or slower than the speed of conveyor 90.

Figure 4:
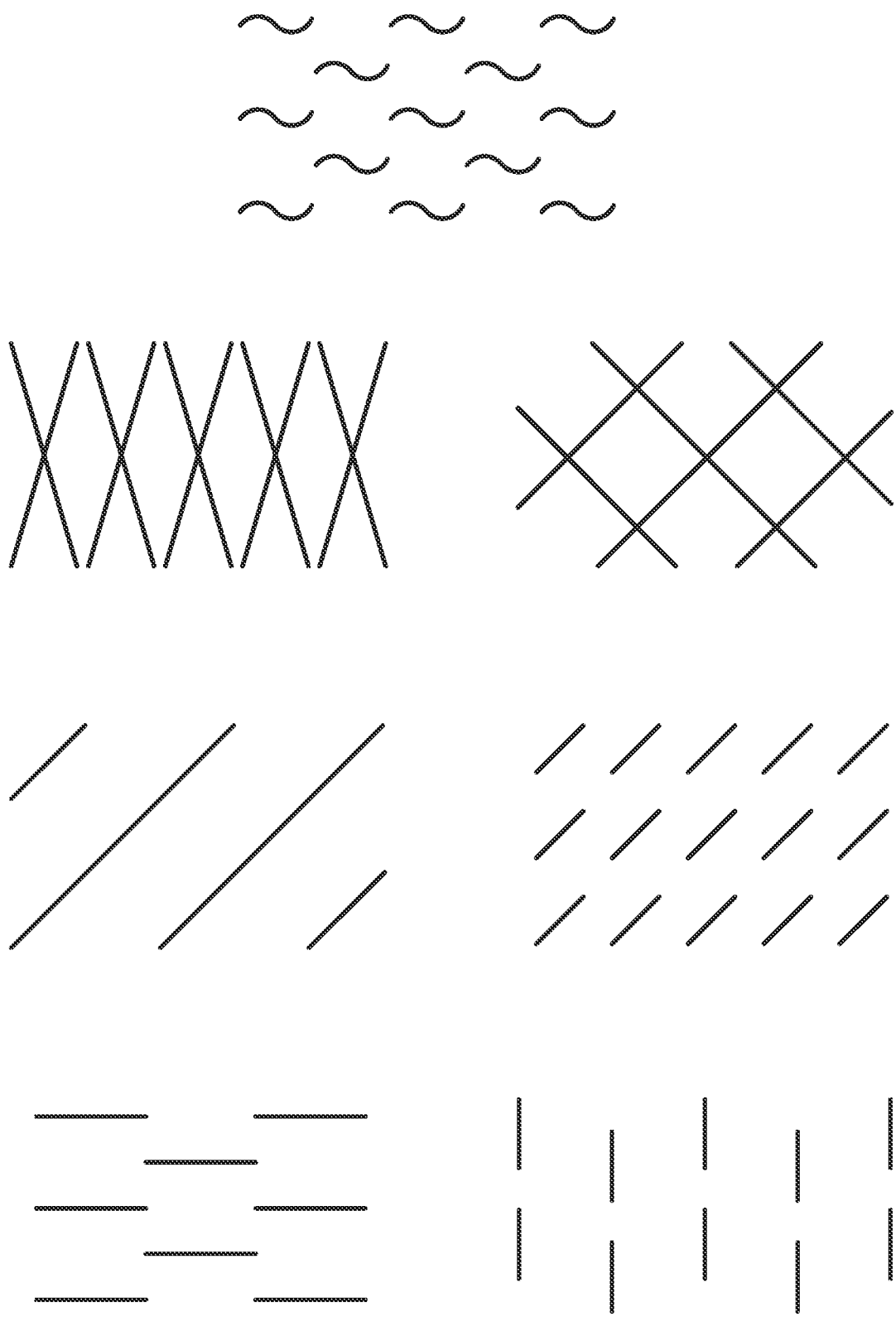
FIG. 4 shows different patterns of the patterns of the incision makers.

FIG. 4 shows different patterns of the protruding blades for cutting a pattern of incisions through at least one of the dough sheets in the multi-layered dough sheet, with the incised surface being the outer surface of the end product. It may be obvious that many patterns should be considered. Each pattern of incisions will result in a specific effect after baking of the end product and the possibilities are endless.

Figure 5:
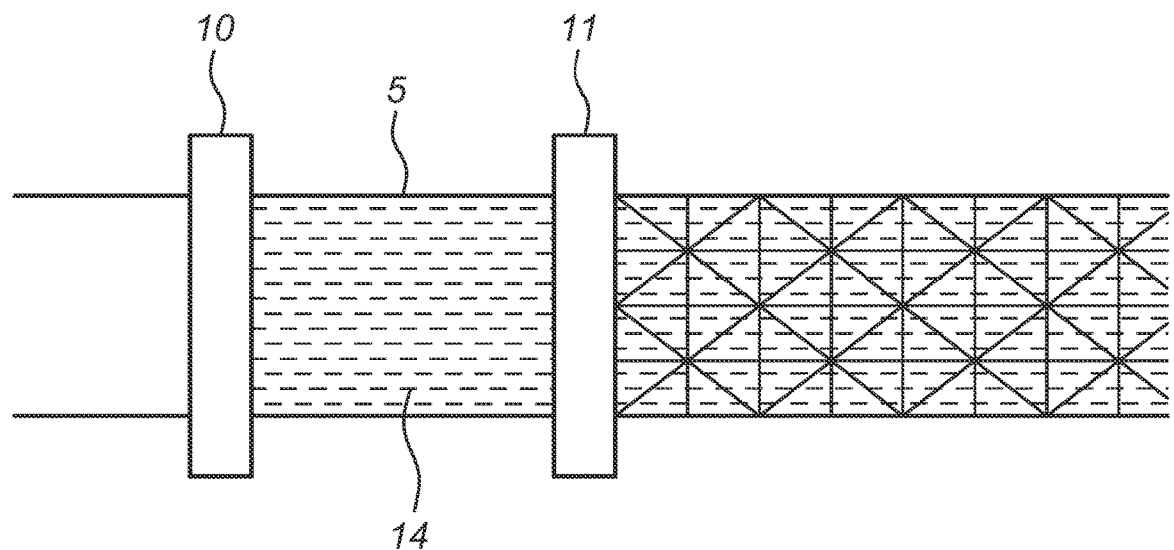
FIG. 5 shows a schematic transparent top view of the multi-layered dough sheet.

FIG. 5 shows a schematic transparent top view of an embodiment of the present invention, showing the multi-layered dough sheet 5, an incision maker 10 for making incisions 14 and a cutting station 11 for cutting the dough sheet into dough pieces.

Figure 6:
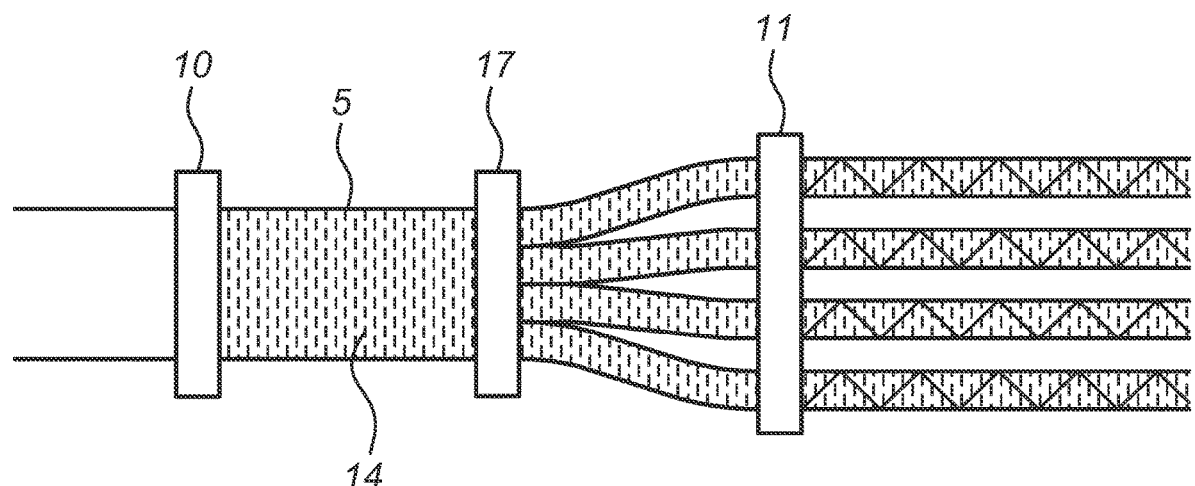
FIG. 6 shows a schematic transparent top view of the multi-layered dough sheet.

FIG. 6 shows a schematic transparent top view of an embodiment of the present invention, showing the multi-layered dough sheet 5, an incision maker 10, for making incisions 14, followed by a spreader 17 so that the dough sheet is spread into dough lanes as input for a cutting station 11 for cutting the dough sheet into dough pieces.

Figure 7:
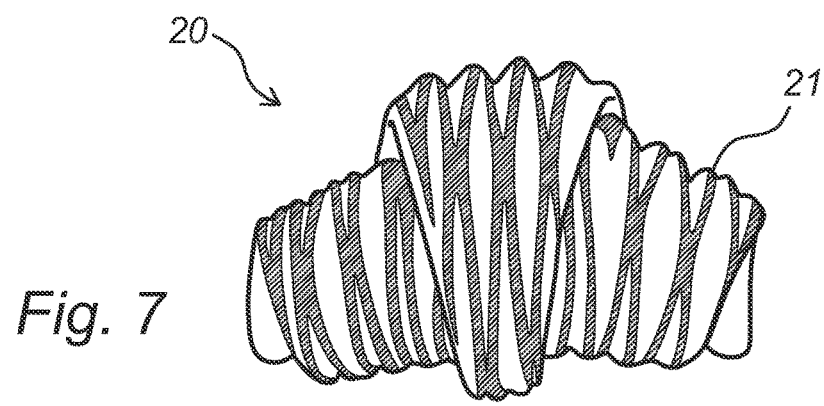
FIG. 7 shows a perspective view of an end product according to the method of the present invention.

FIG. 7 shows a schematic view of an end product 20 according to the method of the present invention. In the figure it is visible that the dough sheet was cut into a dough slice and then rolled up with the incised surface on the outside, wherein the incised outside surface of the dough piece was enabled to rise and thus creating a gap, showing the dough of another dough sheet of different colour 21 underneath.

The protruding blades 8 of the incision maker 10 are dimensioned such that only an incision can be made, without displacing the dough in the dough sheet, meaning a cut without leaving an opening, recess or cavity in particular not a through-hole, whereas the blade actually may cut through the dough sheet. The pattern of the protruding blades 8 and the blades themselves may have different shapes, such as straight or waved. The blades 8 may consist of stainless steel mounted in an aluminium hub, or full stainless steel with a milled cutting pattern. Preferably the tips of the protruding blades 8 have a thickness in the range of 0.1 to 1 mm.

The transporting conveyor 9 may be an endless conveyor, on which dough sheets are transported on the transport surface 2 in a transport direction. The feed line 1 may comprise different rollers to feed the second dough sheet 4 onto the first dough sheet 3. This way, said dough sheets form a multi-layered dough sheet 5 such that the at least two dough sheets are placed directly on top of each other. In an embodiment, the end of the feed line 1 may comprise a roller that applies a force in the direction of the transport surface 2 to form the multi-layered dough sheet, or alternatively the dough sheets may form the multi-layered dough sheet 5 due to the stickiness of the dough sheets themselves. The second dough sheet 4 may differ in characteristics from the first dough sheet 3, preferably of different colour, more preferably of different colour after baking of the end product. It may be conceivable that the dough sheets are sprinkled with water for a better adherence. The formed multi-layered dough sheet 5 is transported in said transport direction. A pattern of incisions is cut by the at least one incision maker 10. These incisions are preferably cuts and not recesses, meaning no dough material is taken away from the dough, the dough sheet remains its weight, and the structure of the dough is mainly unaltered. This incised dough sheet may be used directly for adherence to another dough sheet. The incision may be formed by a cut through a layer of the multi-layered dough sheet. The cuts remain in their position and are not changed until the baking of the end product.

The at least one incision maker 10 may be placed at different positions, more upstream or downstream of the transport direction, depending on the specific embodiment of the device according to the present invention. The orientation of the protruding blades 8 may be substantially perpendicular to the transport direction of the at least one transporting conveyor 9, or oriented in along the direction of the transport direction. Additionally, a pattern of incisions oriented with an angle between the incision and the transport direction may be used as well. Preferably, the incised surface may be the intended surface of the dough piece after rolling of a piece of the multi-layered dough sheet 5. The incised surface may be the surface of the said first dough sheet 3 facing the transport surface 2, wherein the incisions are made through the first dough sheet 3. Alternatively the incised surface may be the surface of the said second dough sheet 4, with the surface opposite of the transport surface 2 being the incised surface and with the incisions made through the second dough sheet 4. The incisions through either one of the dough sheets, enable the other dough sheet to be visible after baking of the end product. It is important to note that the pattern of incisions in at least one of the dough sheets results in a dough sheet with incisions, however free from wide openings. In other words, the width of the dough sheet that is incised substantially remains.

The protruding blades 8 of the incision maker 10 are dimensioned such that only an incision can be made, without displacing the dough in the dough sheet, meaning a cut without leaving an opening, recess or cavity in particular not a through-hole, whereas the blade actually may cut through the dough sheet. These incisions without holes or openings have the advantage that before rolling up no additional rolling operation is necessary to obtain a flat dough sheet, that is essentially without texture.

The device according to the present invention may further comprise at least one pressing station 6, for applying a force on the multi-layered dough sheet in the direction of the transport surface 2 in order to make the layers of the multi-layered dough sheet adhere to each other. The pressing is beneficial to enhance the adherence between the layers of the multi-layered dough sheet 5. The pressing station 6 may comprise a roller that applies a gentle force in the direction of the transport surface 2 on the multi-layered dough sheet 5. In another embodiment, the pressing may be done by the at least one incision maker 10, in this embodiment, preferably a punch, simultaneous with the cutting of the incisions. It may be conceivable that the dough sheets are sprinkled with water or other means for improving adherence.

In an embodiment of the device according to the present invention, the at least one incision maker 10 is a roller or a punch, positioned above the transporting conveyor 9, with a surface facing the transport surface 2. Beneficial is that with this configuration it is possible to perform the pressing and the incision making simultaneously. It also enables a stable position of the dough sheet on the transport conveyor 9 while incisions are made. An example of this embodiment is the roller or punch, wherein the protruding blades 8 are configured to touch the transport surface 2 in an outmost position of the movement with the directional component toward the transport surface 2. Advantage of this configuration is that the incisions can be made precisely through one layer of the multi-layered dough sheet 5. Alternatively, another example of this embodiment is the roller or punch, having at least a position wherein the protruding blades 8 extend toward the transporting surface 2 but with a distance remaining between the transport surface 2 and the closest position of the protruding blade in order not to cut through the entire multi-layered dough sheet and in particular not through all layers the multi-layered dough sheet comprises. Advantage of this configuration is that the incisions can be positioned very precise, since it does not affect the adherence of the layers of the multi-layered dough sheet and it is possible to cut through part of a layer. This would also enable to use a filling layer in between the dough sheets. A potential filing layer would not affect the incised dough sheet, since the incised dough sheet remains in its shape after the incisions are made. All layers that are desired to be used are placed directly on top of each other.

In an embodiment of the present invention, the at least one incision maker 10 is a roller with the axis positioned under the transport surface 2, wherein the protruding blades 8 extend beyond the transport surface 2, having at least one position to cut incisions through the first dough sheet 3. The surface of the dough sheet facing the transport surface 2 is the incised surface, being the intended outside of the dough piece after rolling of the multi-layered dough sheet 5. To use the lower surface, facing the transport surface 2, as the incised surface is very beneficial, because the incised surface may be the intended outside surface after rolling. This means that before the dough sheet is rolled up, flipping the dough sheet becomes not necessary, thus cost effective and less sensitive for processing errors and waste of dough.

It is conceivable that the at least one incision maker 10 has an outermost mantle surface 13, of which the highest point of the mantle in direction of the transport surface 2 coincides with said transport surface 2, from where protruding blades extend. As such the incisions are made in the surface facing the transport surface 2, the lower surface of the multi-layered dough sheet 5, with the same advantages as described above.

After the incisions are made, the incised surface does not show any openings that make it possible to show the layer underneath the incision, a significant visual effect is only visible after rolling of the dough or after baking of the end product.

Furthermore, the device according to the present invention may comprise at least one retaining part 12, comprising at least one roller, spaced at a distance 15 vertically above the at least one incision maker 10, wherein the pattern of protruding blades 8 protrudes less than the vertical distance between the roller and the retaining part 12. This is beneficial for a stable dough sheet to precisely cut the incisions. Preferably, the retaining part 12, comprising at least one roller, is vertically movable to apply a force on the first or the multi-layered dough sheet 5 in the direction of the incision maker 10. Advantage is that this makes the device suitable for a range of different thicknesses of the dough sheet and the depth of the incisions is adjustable.

In an embodiment the device according to the present invention comprises two successive transport conveyors 9, 90, with the incision maker 10 positioned under the transport surface 2, in between them to cut the incisions in the surface of the multi-layered dough sheet or the surface of the first dough sheet facing the transport surface, wherein successively a first conveyor 9, the incision maker 10 and the second conveyor 90 are positioned, all for transporting a dough sheet in the same direction.

The protruding blades 8 may be dimensioned such that the blades can make incisions of a depth of at least 0.1 mm and a maximum of 15 mm, more preferably 2 mm. This has the advantage that it is the best way to show another dough layer after the baking of the end product of the multi-layered dough sheet. The dimensions of the blades may be able to cut an incision, at least equal to the depth of the first dough sheet, or a depth at least equal to the depth of the second dough sheet. The blades may also have a depth for a cut through multiple dough sheets, however less than the total depth of the multi-layered dough sheet.

It may be favourable that the pressing station 6 is positioned consecutive with the at least one incision maker 10, with the pressing station first, followed by the incision maker, downstream of the transport direction. This may have the advantage that it is possible to more precisely define the locations of the incisions in the first dough sheet relative to the second dough sheet.

Moreover, it is possible that the device according to the present invention, facilitates the processing of different kinds of dough sheets, wherein the multi-layered dough sheet comprises at least more than two dough sheets, wherein the depth of a first of the at least one incision maker is equal to the intended depth of the first dough sheet and wherein the depth of a second of the at least one incision maker is equal to the total sum of the intended depth of the first and the second dough sheet. This configuration has the advantage that a lot of different varieties of flavours and structures are possible.

Furthermore, to be more cost effective and efficient, several combinations may be made, for example, that the at least one incision maker 10 may apply a force on the multi-layered dough sheet simultaneously, such that the incision maker 10 also makes the layers of the multi-layered dough sheet adhere to each other. Another combination may be that the incision maker 10 may also cut the multi-layered dough sheet into dough pieces, in particular isosceles triangle shapes, or other shapes that are suitable to be rolled up. Alternatively, in even another combination, the pressing station and the cutting station are the same. These combinations may enable that costs can be saved and more products can be made in the same time. In addition, said combinations facilitate an advantageous compact form of the device, needing less space than other embodiments of the device according to the present invention.

In practice a dough sheet is used in many forms. Therefore, in this document a dough sheet is meant to be understood as a, for example, uniform dough sheet, multi-layered dough sheet, laminated dough sheet, puff pastry dough sheet, French pastry dough sheet, croissant dough sheet or a bread dough sheet or any variations thereof.

The figures are for illustrative purposes only and do in no sense limit the scope of protection as defined by the following claims. Since many modifications, variations, and changes in detail can be made to the described preferred embodiments of the invention, it is intended that all matters in the foregoing description and shown in the accompanying drawings be interpreted as illustrative and not in a limiting sense. Consequently, the scope of the invention should be determined by the appended claims and their legal equivalents.

What is claimed is:

1. A device for processing dough, comprising:
    at least one transporting conveyor having a transport surface for transporting a first dough sheet;
    at least one feed line for feeding at least a second dough sheet onto the first dough sheet to form a multi-layered dough sheet; and
    at least one incision maker positioned downstream from the at least one feed line and positioned above or below the at least one transporting conveyor, wherein the incision maker has a pattern of protruding blades for cutting a pattern of incisions in one surface of the multi-layered dough sheet, and wherein the protruding blades are movable with a directional component towards and from the transport surface;
    a cutting station for cutting the multi-layered dough sheet into dough pieces; and
    a rolling station for rolling up the cut out dough pieces for rolling into croissants.

2. The device according to claim 1, comprising at least one pressing station for applying a force on the multi-layered dough sheet in the direction of the transport surface in order to make the layers of the multi-layered dough sheet adhere to each other.

3. The device according to claim 1 wherein the at least one incision maker is a roller or a punch, positioned above the transporting conveyor.

4. The device according to claim 3 wherein the roller or punch has at least a position where the protruding blades extend toward the transporting surface but with a distance remaining between the transport surface and the closest position of the protruding blade in order not to cut through the entire multi-layered dough sheet and in particular not through all layers the multi-layered dough sheet comprises.

5. The device according to claim 1 wherein the at least one incision maker is a roller with the axis positioned under the transport surface, and wherein the protruding blades extend beyond the transport surface, having at least one position to cut incisions through the first dough sheet.

6. The device according to claim 5 wherein the incision maker has an outermost mantle surface of which the highest point of the mantle in direction of the transport surface coincides with said transport surface, from where protruding blades extend in order not to cut through the entire multi-layered dough sheet and in particular not through all layers the multi-layered dough sheet comprises.

7. The device according to claim 5, comprising at least one retaining part, comprising at least one roller, spaced at a distance vertically above the at least one incision maker, wherein the protruding blades extend beyond the transport surface, at least as far as through the first dough sheet and less than the distance between the retaining part and the incision maker.

8. The device according to claim 7 wherein the retaining part, comprising the at least one roller, is vertically movable to apply a force on the first dough sheet or the multi-layered dough sheet in the direction of the incision maker.

9. The device according to claim 2, wherein the incision maker and the cutting station are the same and/or wherein the pressing station and the cutting station are the same.

10. The device according to claim 1 wherein the rolling station is followed by a bending station for bending the rolled up dough pieces and/or a pinching unit and/or a clamping unit for the ends of the croissants.

11. A method for making croissants, comprising:
    providing a first dough sheet with a conveyor having a transport surface for transporting the first dough sheet;

providing at least a second dough sheet, through at least one feed line, with different characteristics including different colour onto the first dough sheet;

making the at least two sheets of dough into a multi-layered dough sheet by laminating or putting the first and second dough sheets on top of each other;

cutting a pattern of incisions with a pattern of protruding blades in one surface of the multi-layered dough sheet and with a depth that is partly the depth of a total depth of the multi-layered dough piece, substantially the depth of the first dough sheet, wherein the protruding blades are moved with a directional component towards and from of the transport surface and are positioned downstream from the at least one feed line and positioned above or below the conveyor;

cutting the multi-layered dough provided with incisions into dough pieces; and rolling up the cut out dough pieces with the incised surface on the outside.

12. The method according to claim 11, followed by baking the rolled up dough pieces, enabling the incised outside surface of the dough piece to rise and thus creating a gap, showing the dough of another dough sheet underneath.

13. The method according to claim 11, wherein the pattern of incisions in one surface are made in a lower surface of the first dough sheet.

\* \* \* \* \*